United States Patent

Maruhnic et al.

[11] 3,978,199
[45] Aug. 31, 1976

[54] RECOVERING CARBON BLACK FROM WASTE RUBBER

[75] Inventors: Peter Maruhnic, Pennington, N.J.; Ronald Howard Wolk, San Jose, Calif.; Carmine A. Battista, Fairless Hills, Pa.

[73] Assignee: Hydrocarbon Research, Inc., Morristown, N.J.

[22] Filed: Jan. 30, 1975

[21] Appl. No.: 545,500

[52] U.S. Cl. ............................ 423/461; 423/449; 423/109
[51] Int. Cl.² ...................... C01B 31/02; C09C 1/48
[58] Field of Search ............ 423/461, 450, 449, 109

[56] References Cited
UNITED STATES PATENTS

| | | | |
|---|---|---|---|
| 1,175,732 | 3/1916 | Evans et al. | 423/461 |
| 2,149,671 | 3/1939 | Franck et al. | 423/461 |
| 2,631,982 | 3/1953 | Donegan | 423/461 X |
| 3,148,140 | 9/1964 | Kaiser et al. | 423/461 UX |
| 3,375,188 | 3/1968 | Bloomer | 423/461 X |
| 3,704,108 | 11/1972 | Alpert | 423/461 X |
| 3,808,328 | 4/1974 | Kelly | 423/449 |
| 3,823,224 | 7/1974 | Laman et al. | 423/461 X |

OTHER PUBLICATIONS

"General College Chem.," by Babur et al., 1940 Ed., pp. 66–68, Pub. by Thomas Y. Crowell Co., New York.

*Primary Examiner*—Edward Stern

[57] ABSTRACT

Carbon black is recovered from vulcanized waste rubber such as automobile tires or other articles by reacting pieces of the rubber with an aromatic oil solvent in a stirred reactor at 500°–700°F temperature and about 25–100 psig pressure for 0.5–2 hours residence time. The resulting solids-liquid mixture is processed to remove solids, and the resulting solid product is then dried, screened and chemically treated to recover the carbon black in dry powder form. The remaining solvent oil is also recovered and a portion reused in the process.

6 Claims, 1 Drawing Figure

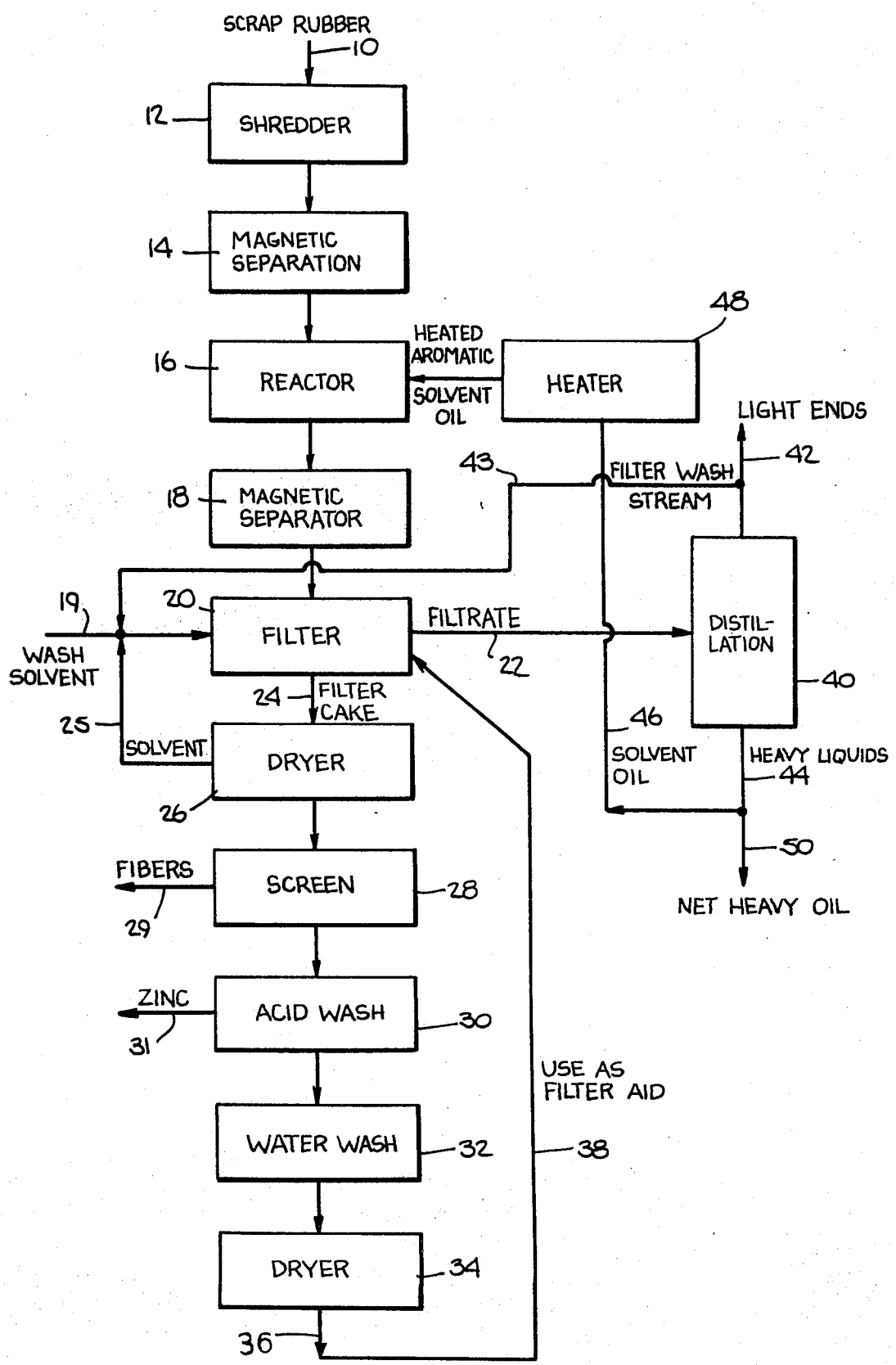

RECOVERING CARBON BLACK FROM WASTE RUBBER

BACKGROUND OF THE INVENTION

The disposal of waste rubber, particularly from discarded automotive vehicle tires, presents a considerable problem in countries such as the U.S. having a great number of automobiles and trucks. Disposal methods presently being used for scrap tires include burning them as fuel, for land fill, as an additive material for asphalt road surfacing mixtures, and for building artificial reefs in the ocean to promote fish spawning. However, none of these disposal methods is designed to recover and recycle the useful materials within the waste rubber in an economic and practical manner. Such recovery needs have become more urgent due to recent substantial increases in the costs of crude oil and petroleum fractions from which carbon black is made.

SUMMARY OF THE INVENTION

We have discovered that useful carbon black and aromatic oil products can be recovered from vulcanized waste rubber materials, and particularly from scrapped automotive vehicle tires, by a solvent reaction process using an aromatic solvent oil to dissolve the rubber under specific temperature and pressure conditions, followed by a separation step to recover the carbon black solids. The resulting carbon black material is acid washed to remove the zinc and other ash components, then water washed and dried to produce a useful carbon black product. The liquid portion remaining from the carbon black separation step can be recovered and reused as the aromatic solvent oil in the process, with the remaining oil providing a useful hydrocarbon oil product.

More specifically, pieces of waste vulcanized rubber, such as automobile tires which are preferably chopped into convenient size pieces such as usually having a major dimension not exceeding about 6 inches and preferably about 0.25 to 2 inches, are mixed with a heated aromatic solvent oil and fed into a heated stirred reactor for dissolving the rubber. Operating conditions for the reactor are 500° to 700°F temperature, preferably 550°-650°F, and a pressure between 25-100 psig in a non-oxidizing atmosphere. Residence time in the reactor should be sufficient to substantially totally dissolve the rubber solids in the solvent liquid, and is usually 0.5-2 hours depending upon the size of the waste rubber pieces charged into the reactor and the conditions used, with larger pieces of rubber usually requiring the longer dissolving time.

After the pieces of rubber have been dissolved in the solvent oil, any extraneous material such as metal bead wires, studs, and included metal or stones, etc., is removed, usually by gravity settling from the bottom of the dissolving tank or additionally by magnetic separation means. The resulting liquid slurry is next passed to a solids separation step where the oil is substantially separated from the remaining solids. Preferably, the resulting liquid-solids slurry mixture is filtered to remove the remaining solids portion which is principally carbon black with usually some undissolved fiber material included. The resulting carbon black material is then dried and screened to remove any undissolved fibers and any other remaining foreign material. This carbon black is then washed, first with an acid such as hydrochloric acid to remove zinc and other ash compounds, and then water washed to remove the acid and recover the carbon black product. The recovered carbon black is then usually dried prior to further use as desired.

The waste rubber may be processed for recovery of dry carbon black using either a batch or continuous type process, with the continuous process being preferred for large scale operations. For a batch type process, larger pieces of rubber may be used, such as whole automobile tires. However, for a continuous dissolving process, smaller pieces of rubber such as 0.5 to 1 inch size are usually preferred for handling such as in a screw conveyor feed means.

DESCRIPTION OF THE DRAWINGS

FIG. 1 is a block diagram illustrating the processing steps and means employed for carrying out the various embodiments of the invention.

DESCRIPTION OF THE PREFERRED EMBODIMENT

Referring to FIG. 1, the scrap rubber material at 10, which principally comprises discarded automobile tires, is chopped or shredded at 12 into convenient sized pieces such as having a major dimension not exceeding about 6 inches. The chopped rubber pieces may next be passed through a magnetic separation step 14 to remove any loose magnetizable metal, such as metal inclusions, studs, bead wires, etc. The resulting partially demetallized rubber pieces are next passed to a pressurizable mixing tank or reactor 16, where the rubber pieces are mixed with a heated aromatic solvent oil for dissolving the rubber. Such solvent oil will usually be recovered from the process, however, during process start-up an aromatic oil such as Ashland APO or anthracene oil may be used.

The mixing tank or reactor 16 is usually operated at 500°-700°F temperature and 25-100 psig inert gas pressure, and suitable mechanical mixing means is provided to promote rapid dissolving of the rubber pieces in the solvent oil. If desired, this reactor can be provided in duplicate for continuous operations, so that one reactor can be filled with rubber pieces and solvent oil while the other tank is in mixing and dissolving step operation.

After the rubber pieces have been substantially totally dissolved in the solvent oil, which may require about 0.5-2 hours residence time depending upon piece sizes, temperature and degree of mixing used, the mixing is stopped and the resulting slurry material is withdrawn from the reactor 16. The metallic and other foreign material then settles to the bottom of the reactor and is removed separately. If desired, the slurry material can be passed to a magnetic separation step 18 for removal of any remaining metallic pieces not removed previously.

The slurry is then passed to filtration step 20 for removal of the carbon black along with any undissolved fibers and any remaining metallic bits or foreign pieces not removed by the preceding solids separation step or steps. This filter 20 is preferably a rotary drum precoat type filter, for which the filter aid material used is preferably a portion of the recovered carbon black material. A filtrate liquid is withdrawn at 22 and processed for recovery of the solvent oil as explained subsequently. The resulting filter cake material 24 is washed from the filter using recovered light solvent ends stream 19, and is then passed to a drying step 26, from which a light solvent stream 25 is recovered for reuse.

The resulting dried filter cake comprising mainly carbon black particles can next be screened at 28 to remove any fibers at 29 not dissolved in mixing tank reactor 16 and also any metals or foreign particles not previously removed. The resulting carbon black material is next acid washed at 30, such as with hydrochloric acid to remove the zinc and most other ash components remaining in the carbon black. If desired, the zinc material can be recovered at 31. Following the acid wash step, the carbon black is water washed at 32 to remove the remaining acid residue. The recovered carbon black material is next dried at 34, and the dried carbon black material at 36 can be marketed as a useful product as a replacement for or to be mixed with freshly produced carbon black material. A portion 38 of the carbon black recovered is preferably used as a filter aid material in filtration step 20.

Returning now to filtrate liquid stream 22, it is passed to a distillation step 40 in which the light liquid ends are removed at 42 and the higher boiling heavy liquids are withdrawn at 44. A portion 43 of the light liquid material recovered can be used as filter wash liquid stream 19. A portion 46 of this heavy aromatic solvent oil is heated as necessary at heater 48 and then recycled to mixing tank 16 as the solvent oil therein. The remaining oil is withdrawn as a net heavy oil product at 50.

This invention may be better understood by reference to the following examples of operations.

EXAMPLE I

Pieces of vulcanized rubber from automotive tires, some containing polymeric fibers, were cut into convenient size pieces and placed in a 1-liter capacity autoclave equipped with stirring means. Hot aromatic oil was added so as to provide a slurry and the miture was then pressurized to 50 psig with nitrogen gas and heated to a desired temperature while being stirred until the rubber pieces were completely dissolved. The test conditions are given in Table I:

TABLE I

| FEEDSTOCKS AND CONDITIONS | | | |
|---|---|---|---|
| Run Number | A | B | C |
| Solids Charged into Reactor | ¼-inch Rubber Stock with Fibers | | Tractor Tire Tread (5" × ¼" × 1¼") |
| Oil Charged into Reactor | Regular Anthracene | Kuwait Gas Oil | Regular Anthracene |
| °API | -8 | 22 | -8 |
| Reactor Temp., °F | 600 | 600 | 600 |
| Reactor Pressure, psig | 50 | 50 | 50 |
| Stirrer Speed, rpm | 200 | 200 | 200 |
| Run Length, hrs. | 1 | 1 | 2 |

After the rubber pieces had been thoroughly dissolved in the solvent oil, the solution was then screened at room temperature through a 100 mesh screen and the resulting liquid product was extracted with benzene solvent so as to recover the carbon black material. The remaining plus 100 mesh size material was also extracted with benzene to recover any unreacted fibers and rubber particles. The benzene from the rubber extraction step was distilled and recovered. Results are presented in Table II:

TABLE II

| SUMMARY OF YIELDS AND PRODUCT INSPECTIONS | | | |
|---|---|---|---|
| Run Number | A | B | C |
| FEED, Grams | | | |
| Rubber Solids | 50 | 50 | 67 |
| Aromatic Oil | 210 | 200 | 268 |
| Total Feed | 260 | 250 | 335 |
| PRODUCTS, Grams | | | |
| Total Solids plus Oil | 247 | 243 | 330 |
| Carbon Black | 11.3 | 17.7 | 2.08 |
| Fibers (plus entrained carbon black) | 0.548 | 3.808 | 0 |
| Gas | 3.3 | 1.3 | 1.4 |
| MATERIAL BALANCE | | | |
| Total Solids plus Oil plus Gas × 100 / Total Feed | 96.3 | 97.7 | 98.9 |
| PRODUCT INSPECTIONS | | | |
| Carbon Black, DBP* absorption number | 78.3 | 48.3 | 86.0 |
| Extracted Oil Properties | | | |
| Gravity, oAPI | 3.0 | 28.2 | −1.9 |
| Distillation, °F | | | |
| IBP/5% | 179/239 | 494/534 | 180/214 |
| 10% | 528 | 560 | 544 |
| 20% | 582 | 587 | 587 |
| 30% | 613 | 600 | 616 |
| 40% | 642 | 616 | 644 |
| 50% | | 630 | |

TABLE II-continued
SUMMARY OF YIELDS AND PRODUCT INSPECTIONS

| Run Number | A | B | C |
|---|---|---|---|
| | 60% | | 641 |

*the DBP (dibutylphthalate) absorption number is an indication of the quality of the carbon black recovered as measured by its ability to stabilize rubber to enhance its structural properties.

It is noted that moderate size chunks of rubber up to 5 inch dimension as well as the polymeric fibers could be dissolved at 600°F and 50 psig $N_2$ pressure. Use of the aromatic anthracene oil solvent produced generally better quality carbon black as indicated by its higher DBP number than the Kuwait heavy gas oil solvent used. However, both carbon black samples recovered were of good quality as indicated by the DBP tests performed. Furthermore, more than 80 percent of the polymeric fibers dissolved, indicating that such fibers in automotive tires or other rubber products can be dissolved by this process.

EXAMPLE II

As additional stirred autoclave run was made to verify the previous results. The rubber pieces charged into the reactor were ¼ inch ground vulcanized rubber containing fibers, and the oil charged was the same specification aromatic anthracene oil as used for Example I. The materials were mixed as before in a stirred autoclave at 600°F and 50 psig nitrogen pressure for one hour residence time. The test conditions and initial results are presented in Table III:

TABLE III

| Run Number | D |
|---|---|
| Feed, Grams | |
| Solids charged to reactor | 50 |
| Anthracene oil charge to reactor | 210 |
| Reactor Temperature, °F | 600 |
| Reactor pressure, psig | 50 |
| Total dissolved slurry product recovered from reactor, gm | 246 |
| Solid product recovered from extraction, gm (carbon, ash, unconverted fibers) | 16.2 |
| Carbon product recovered, gm | 15.7 |
| Unreacted fibers, gm | 0.5 |
| Recovered oil | |
| degree API | −4.7 |
| sulfur, W % | 0.73 |

After the products were recovered from the stirred autoclave, they were extracted with boiling recirculating benzene at 80°C in a Soxhlet extractor using medium porosity alundum thimble. The solids recovered from the extractor were dried at 220°F, the dry lumps were crushed, and the samples screened through a 100 mesh sieve. The −100 mesh carbon black material analyzed as follows:

Run D — Ash (at 100°F), W % 13.86; DBP Number 90.6; and sulfur, W % 2.6.

The dry carbon black product was then extracted in a Soxhlet extractor with constant boiling hydrochloric acid for 16 hours and then water washed and dried at 220°F. After this treatment, the carbon black showed the following analysis:

Run D — Ash (at 1000°F), W % 4.77; DBP Number 96.4; and sulfur, W % 0.98.

The plus 100 mesh product fraction from Run D was found by inspection to consist mostly of lumps of carbon mixed with tangled fibers. This mix was rotapped for several hours and inspected. Many of the fibers had balled up and separated from the carbon. Lumps of carbon in the screens were crushed and the rotapping resumed. After several hours, the balls of fibers were removed and the carbon left on the screens was weighed to determine the yields given in Table III.

Although we have shown and described a preferred form of embodiment of our invention, we are aware that modifications may be made thereto within the spirit and scope of the disclosure and as defined by the appended claims.

We claim:

1. A process for recovering carbon black from scrap vulcanized rubber, comprising the steps of:
   a. dissolving rubber pieces in an aromatic solvent oil under inert conditions in a stirred reactor at about 25–100 psig pressure and about 500°–700°F for a time sufficient to dissolve substantially all the rubber and to form a liquid-solid slurry mixture;
   b. removing metallic and other foreign particles from the liquid-solid slurry mixture and passing the resultant liquid-solid slurry through a filter for separating the resultant remaining solids portion containing carbon black from the liquid-solid slurry mixture;
   c. distilling the resultant filtrate to recover a light solvent and returning at least a portion thereof to the filter of step (b) along with the liquid-solid slurry mixture of step (a) and passing at least a portion of recovered heavy aromatic solvent oil resulting from said distillation to the stirred reactor of step (a);
   d. drying and screening the separated carbon black of step (b) to remove any remaining fibers and foreign particles;
   e. removing zinc and ash compounds from the carbon black of step (d) by washing the carbon black with an acid adapted to remove zinc and ash compounds;
   f. washing the resulting carbon black of step (e) with water to remove any acid remaining after step (e); and
   g. drying the resultant carbon black.

2. The process of claim 1 wherein the carbon black is separated from the dissolved liquid slurry by a filtration step utilizing carbon black as the filter aid material.

3. The process of claim 1, wherein the vulcanized rubber pieces are chopped to smaller size having a major dimension of 0.25 to 2 inches.

4. The process of claim 1, wherein the liquid portion resulting from step (c) is distilled and the resulting aromatic solvent oil is removed.

5. The process of claim 1 wherein fine metal pieces are removed by a magnetic separation step downstream of the reactor.

6. The process of claim 1 in which step (a) is conducted for a time of about 0.5–2 hours.

* * * * *